United States Patent
Ou et al.

(10) Patent No.: US 12,285,912 B2
(45) Date of Patent: Apr. 29, 2025

(54) ADDITIVE MANUFACTURING ON PLIABLE SUBSTRATES

(71) Applicant: OPT Industries, Inc., Medford, MA (US)

(72) Inventors: Jifei Ou, Medford, MA (US); William Curtis Stone, Tweksbury, MA (US); Carlo Bares, Somerville, MA (US); August Rabe, Cambridge, MA (US)

(73) Assignee: OPT Industries, Inc., Medford, MA (US)

( * ) Notice: Subject to any disclaimer, the term of this patent is extended or adjusted under 35 U.S.C. 154(b) by 268 days.

(21) Appl. No.: 17/668,503

(22) Filed: Feb. 10, 2022

(65) Prior Publication Data

US 2022/0250318 A1     Aug. 11, 2022

Related U.S. Application Data

(60) Provisional application No. 63/147,960, filed on Feb. 10, 2021.

(51) Int. Cl.
*B29C 64/245* (2017.01)
*B29C 64/124* (2017.01)
*B33Y 10/00* (2015.01)
*B33Y 30/00* (2015.01)

(52) U.S. Cl.
CPC .......... *B29C 64/245* (2017.08); *B29C 64/124* (2017.08); *B33Y 10/00* (2014.12); *B33Y 30/00* (2014.12)

(58) Field of Classification Search
CPC ... B29C 64/124; B29C 64/129; B29C 64/135; B29C 64/236; B29C 64/264; B29C 64/245
See application file for complete search history.

(56) References Cited

U.S. PATENT DOCUMENTS

| | | | |
|---|---|---|---|
| 5,655,201 A * | 8/1997 | Islam | G03G 15/6591 399/335 |
| 9,664,210 B2 | 5/2017 | Ou et al. | |
| 9,908,295 B2 | 3/2018 | Ou et al. | |
| 10,509,559 B2 | 12/2019 | Ou et al. | |
| 10,836,101 B2 | 11/2020 | Elsey | |

(Continued)

FOREIGN PATENT DOCUMENTS

WO    WO 2020/003156 A2    1/2020

OTHER PUBLICATIONS

International Search Report and Written Opinion mailed Apr. 28, 2022, in connection with International Application No. PCT/US2022/015906.

(Continued)

*Primary Examiner* — Nahida Sultana
*Assistant Examiner* — Mohamed K Ahmed Ali
(74) *Attorney, Agent, or Firm* — Wolf, Greenfield & Sacks, P.C.

(57) ABSTRACT

Provided herein are systems and methods for printing a 3D object on a pliable substrate. In some aspects, the pliable substrate is moved through a vat of polymeric precursor while a mechanism (e.g., having opposing belts) maintains contact with the peripheral edges of the substrate. The systems and methods described herein can have certain advantages, such as precise control over the pliable substrate, allowing for precision printing of 3D articles.

17 Claims, 13 Drawing Sheets

(56) References Cited

U.S. PATENT DOCUMENTS

| | | |
|---|---|---|
| 11,104,060 B2 | 8/2021 | Ou et al. |
| 2010/0227068 A1* | 9/2010 | Boot ..................... B29C 64/135 |
| | | 118/56 |
| 2012/0045533 A1* | 2/2012 | Gregoratto .......... H01L 31/0322 |
| | | 425/104 |
| 2013/0270746 A1* | 10/2013 | Elsey ..................... B33Y 10/00 |
| | | 264/129 |
| 2014/0191442 A1* | 7/2014 | Elsey ..................... B29C 64/223 |
| | | 264/401 |
| 2016/0325505 A1 | 11/2016 | Ou et al. |
| 2018/0169940 A1 | 6/2018 | Dunne et al. |
| 2019/0009459 A1 | 1/2019 | Franke et al. |
| 2019/0047213 A1 | 2/2019 | Stadlmann |
| 2019/0366630 A1 | 12/2019 | Oikonomopoulos et al. |
| 2020/0070410 A1 | 3/2020 | Ou et al. |
| 2020/0072276 A1 | 3/2020 | Ou et al. |
| 2020/0087824 A1 | 3/2020 | Ou et al. |

OTHER PUBLICATIONS

Extended European Search Report dated Nov. 27, 2024, in connection with European Application No. 22753313.0.

* cited by examiner

ADDITIVE MANUFACTURING ON PLIABLE SUBSTRATES

NOTICE OF MATERIAL SUBJECT TO COPYRIGHT PROTECTION

Portions of the material in this patent document are subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

RELATED APPLICATIONS

This Application is a Non-Provisional of Provisional (35 USC 119 (e)) of U.S. Application Ser. No. 63/147,960, filed Feb. 10, 2021, entitled "SYSTEMS AND METHODS FOR 3D PRINTING ON PLIABLE SUBSTRATES", which is hereby incorporated by reference in its entirety.

BACKGROUND

Additive manufacturing technology, also known as 3D printing, allows for the manufacture of finished products with complex geometries that are difficult or impossible to make with other technologies. High-resolution stereolithography 3D printing, specifically Digital Light Processing (DLP) printing technology, can allow printing resolutions of less than 100 micrometers (um). High-resolution 3D printing allows one to produce intricate structures to reduce object weight, construct metamaterials, realize biomimicry design or simply achieve aesthetic surface textures.

SUMMARY

Although the resolution of recent 3D printers has been improving, economical production of 3D-printed articles can be limited by the throughput of some 3D printers. For instance, throughput can be limited if the printer is not configured for continuous production. Serial or batched printing of individual articles can have unproductive down time e.g., associated with returning the printer to its initial state.

The systems and methods described herein can increase the productivity of 3D printing by printing the articles on a pliable substrate that is e.g., dispensed from a roll and moved through a volume of polymer precursor. Such a system can print continuously without needing to be returned to an initial state. Productivity can be further improved by increasing the width of the roll of pliable substrate. However, wider substrates are more prone to sagging, bowing, warping, wrinkling, or otherwise not being consistently flat during 3D printing. In an aspect, systems and methods are provided herein for maintaining a flat and well controlled pliable substrate for 3D printing.

According to one aspect a method for printing a 3D object is provided. The method comprises directing radiation at a first location of a volume of polymer precursor adjacent to a pliable substrate, thereby forming a first polymer layer on or adjacent to the substrate, moving a pliable substrate through the volume of polymer precursor while maintaining contact with the peripheral edges of the substrate, and directing radiation at a second location of the volume of polymer precursor which is adjacent to the first location, thereby forming a second polymer layer on the first polymer layer. According to one embodiment, the peripheral edges are substantially parallel to a direction in which the substrate is moved. According to one embodiment, the pliable substrate is pinched at its peripheral edges. According to one embodiment, a surface of the substrate on which the first polymer layer is formed is not contacted by a roller spanning a width of the substrate.

According to one embodiment, the pliable substrate moves into the volume of polymer precursor, bends, and exits the volume of polymer precursor. According to one embodiment, a first linear pinch zone occurs before a bend in the pliable substrate and a second linear pinch zone occurs after the bend in the pliable substrate. According to one embodiment, a series of rollers guide the pliable substrate through the bend. According to one embodiment, the method further comprising supporting a back side of the pliable substrate which is on an opposite side of a surface of the pliable substrate upon which the first polymer layer is printed. According to one embodiment, contact is maintained with the peripheral edges along substantially the entire portion of the pliable substrate that is in contact with the volume of polymer precursor. According to one embodiment, the contact is maintained with the peripheral edges of the substrate until the second polymer layer is cured. According to one embodiment, the pliable substrate is under a substantially constant tension while the substrate is in the volume of polymer precursor.

According to one embodiment, the method further comprising guiding or positioning the pliable substrate prior to maintaining contact with the peripheral edges of the substrate. According to one embodiment, the method further comprising smoothing the pliable substrate. According to one embodiment, the pliable substrate is smoothed prior to maintaining contact with the peripheral edges of the substrate. According to one embodiment, the method further comprising repeating (c) to produce a 3D polymer object. According to one embodiment, the method further comprising removing the 3D polymer object from the substrate. According to one embodiment, the method further comprising cutting the substrate. According to one embodiment, a mechanism that maintains contact with the peripheral edges does not contact a portion of the pliable substrate upon which the first polymer layer is formed. According to one embodiment, the method further comprising changing a direction in which the substrate is moved through the polymer precursor.

According to one embodiment, the substrate is moved through the polymer precursor with a mechanical precision of less than about 100, less than about 50, less than about 30, less than about 20, or less than about 10 micrometers (um). According to one embodiment, the second polymer layer is formed on the first polymer layer with a pixel-by-pixel precision of less than about 100, less than about 50, less than about 30, less than about 20, or less than about 10 micrometers (um). According to one embodiment, the first and second layers of polymer have a thickness precision of less than about 100, less than about 50, less than about 30, less than about 20, or less than about 10 micrometers (um). According to one embodiment, (b) and (c) are performed at substantially the same time such that the first layer and second layer of polymer are substantially continuous. According to one embodiment, (b) and (c) are performed at substantially the same time such that the first layer and second layer of polymer are not distinct layers. According to one embodiment, the pliable substrate is elastic. According to one embodiment, the pliable substrate is a nylon mesh. According to one embodiment, the radiation is UV light. According to one embodiment, the radiation is directed using a digital light processor (DLP).

According to one aspect a system for printing a 3D object is provided. The system comprises a vat configured to maintain a solution of polymer precursor at a substantially constant level, a mechanism configured to move a pliable substrate through the vat while maintaining contact with the peripheral edges of the substrate, and a digital light processor (DLP) configured to direct radiation at a chosen portion of the solution of polymer precursor. According to one embodiment, the mechanism and the digital light processor are configured to print a 3D object. According to one embodiment, (i) the DLP creates a first polymer layer on or adjacent to the pliable substrate, (ii) the mechanism moves the pliable substrate through the vat, and (iii) the DLP creates a second polymer layer on the first polymer layer. According to one embodiment, the (ii-iii) are performed at substantially the same time. According to one embodiment, the first layer and second layer of polymer are not distinct layers.

According to one embodiment, the peripheral edges are substantially parallel to a direction in which the substrate is moved. According to one embodiment, the mechanism is configured to pinch the pliable substrate at its peripheral edges. According to one embodiment, the mechanism does not include a roller spanning a width of the substrate on a surface of the substrate on which the first polymer layer is formed. According to one embodiment, the mechanism is configured to move the pliable substrate into the volume of polymer precursor, bend the pliable substrate, and remove the volume of polymer precursor. According to one embodiment, a first linear pinch zone occurs before a bend in the pliable substrate and a second linear pinch zone occurs after the bend in the pliable substrate. According to one embodiment, the mechanism includes a series of rollers to guide the pliable substrate through the bend.

According to one embodiment, the mechanism further comprises a roller on an opposite side of a surface of the pliable substrate upon which the first polymer layer is printed that supports a back side of the pliable substrate. According to one embodiment, the mechanism maintains contact with the peripheral edges along substantially the entire portion of the pliable substrate that is in contact with the volume of polymer precursor. According to one embodiment, the mechanism maintains contact with the peripheral edges of the substrate until the second polymer layer is cured. According to one embodiment, the mechanism places the pliable substrate under a substantially constant tension while the substrate is in the volume of polymer precursor. According to one embodiment, the system further comprising a guide configured to position the pliable substrate for contact with the peripheral edges of the substrate. According to one embodiment, the system further comprising a clamping spring for smoothing the pliable substrate. According to one embodiment the system is capable of repeating (c) to produce a 3D polymer object. According to one embodiment, the system is capable of removing the 3D polymer object from the substrate. According to one embodiment, the system further comprises a module configured to cut the substrate after it exits the vat.

According to one embodiment, the mechanism does not contact a portion of the pliable substrate upon which the first polymer layer is formed. According to one embodiment, the mechanism is capable of changing a direction in which the substrate is moved through the polymer precursor. According to one embodiment, the mechanism is capable of moving the substrate through the polymer precursor with a mechanical precision of less than about 100, less than about 50, less than about 30, less than about 20, or less than about 10 micrometers (um). According to one embodiment, the second polymer layer is formed on the first polymer layer with a pixel-by-pixel precision of less than about 100, less than about 50, less than about 30, less than about 20, or less than about 10 micrometers (um). According to one embodiment, the first and second layers of polymer have a thickness precision of less than about 100, less than about 50, less than about 30, less than about 20, or less than about 10 micrometers (um). According to one embodiment, the pliable substrate is elastic. According to one embodiment, the pliable substrate is a nylon mesh. According to one embodiment, the radiation is UV light.

According to one aspect a method for printing a 3D object is provided. The method comprises directing radiation through a transparent window of a vat containing a volume of polymer precursor, wherein the radiation is directed at a first location which is adjacent to a pliable substrate, thereby forming a first polymer layer on or adjacent to the substrate, moving the pliable substrate through the volume of polymer precursor, and directing radiation through the transparent window at a second location which is adjacent to the first location, thereby forming a second polymer layer on the first polymer layer. According to one embodiment, the pliable substrate is a nylon mesh. According to one embodiment, the pliable substrate is supported on its back side along substantially all of a printing path. According to one embodiment, the printing path starts adjacent to the first location and ends when the substrate exits the vat. According to one embodiment, the pliable substrate is supported with a belt. According to one embodiment, the back side of the substrate is distal to the transparent window. According to one embodiment, the pliable substrate is moved through the volume of polymer precursor using a mechanism that maintains contact with the peripheral edges of the substrate. According to one embodiment, the first polymer layer has a higher affinity for the pliable substrate than for the transparent window. According to one embodiment, the transparent window is vibrated. According to one embodiment the transparent window has grooves that allow non-polymerized polymer precursor to flow between the transparent window and the first polymer layer. According to one embodiment, a temperature of the transparent window is greater or less than a temperature of the vat of polymer precursor. According to one embodiment, an amount of polymer precursor is directed with force toward the transparent window.

According to one aspect a system for printing a 3D object is provided. The system comprises a vat having a transparent window, which vat is configured to maintain a solution of polymer precursor at a substantially constant level, a mechanism configured to move a pliable substrate through the vat in proximity to the transparent window, and a digital light processor (DLP) configured to direct radiation through the transparent window at a chosen portion of the solution of polymer precursor. According to one embodiment, the pliable substrate is a nylon mesh. According to one embodiment, the mechanism supports the pliable substrate on its back side along substantially all of a printing path. According to one embodiment, the printing path starts adjacent to the first location and ends when the substrate exits the vat. According to one embodiment, the pliable substrate is supported with a belt. According to one embodiment, the back side of the substrate is distal to the transparent window. According to one embodiment, the first polymer layer has a higher affinity for the pliable substrate than for the transparent window. According to one embodiment, the transparent window is capable of being vibrated. According to one embodiment, the transparent window has grooves that allow non-polymerized polymer precursor to flow between the transparent window and the first polymer layer. According to one embodiment, a temperature of the transparent window is greater or less than a temperature of the vat of polymer precursor. According to one embodiment, the system further comprises a nozzle that is capable of directing an amount of polymer precursor toward the transparent window.

It should be appreciated that all combinations of the foregoing concepts and additional concepts discussed in greater detail below (provided such concepts are not mutually inconsistent) are contemplated as being part of the inventive subject matter disclosed herein. In particular, all combinations of subject matter within this disclosure are contemplated as being part of the inventive subject matter disclosed herein.

Still other aspects, examples, and advantages of these exemplary aspects and examples, are discussed in detail below. Moreover, it is to be understood that both the foregoing information and the following detailed description are merely illustrative examples of various aspects and examples, and are intended to provide an overview or framework for understanding the nature and character of the claimed aspects and examples. Any example disclosed herein may be combined with any other example in any manner consistent with at least one of the objects, aims, and needs disclosed herein, and references to "an example," "some examples," "an alternate example," "various examples," "one example," "at least one example," "this and other examples" or the like are not necessarily mutually exclusive and are intended to indicate that a particular feature, structure, or characteristic described in connection with the example may be included in at least one example. The appearances of such terms herein are not necessarily all referring to the same example.

DETAILED DESCRIPTION OF INVENTION

Figure 1:
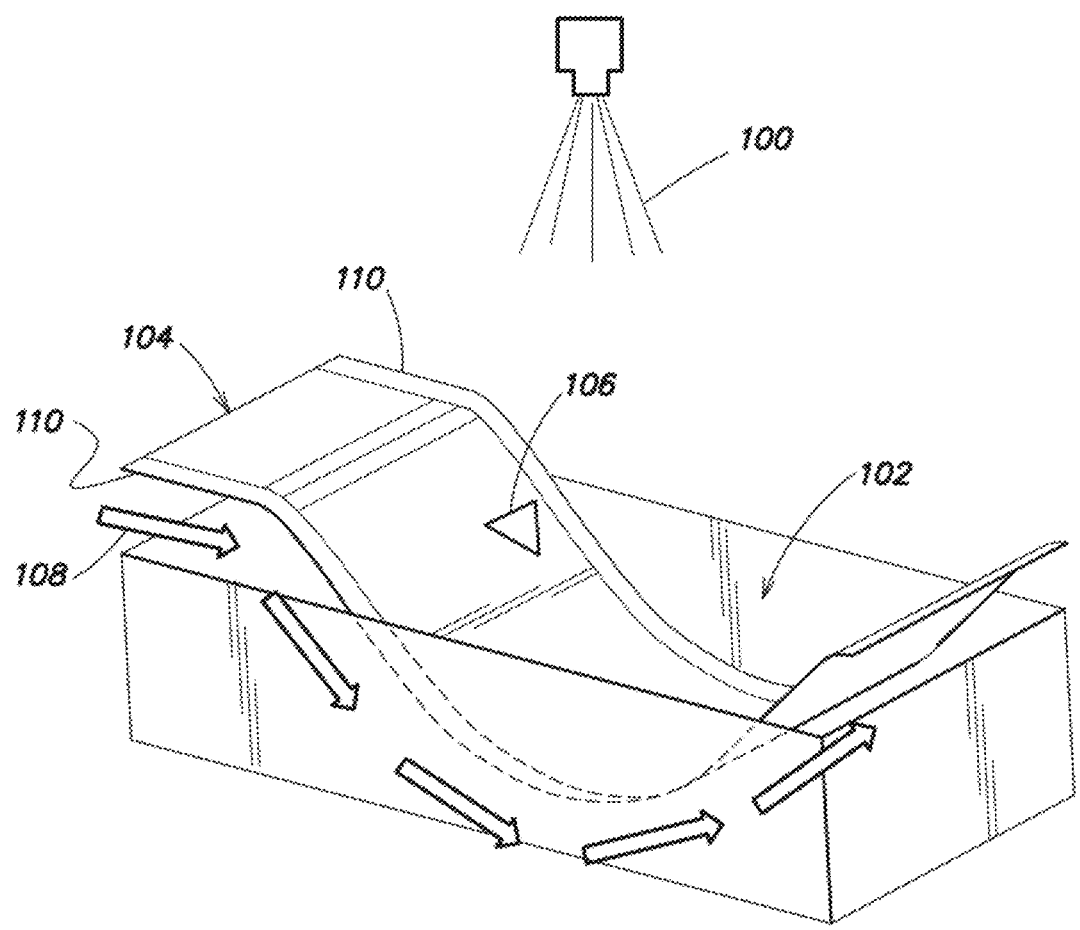
FIG. 1 shows an example of printing a 3D object on a pliable substrate.

Additive manufacturing technology, also known as 3D printing, is a manufacturing method that utilizes the instrument to manufacture finished "additive" products with complex geometries that can be difficult or impossible to make with other conventional manufacturing methods such as molding (inject and transfer molding, etc.) and subtractive manufacturing (laser cutting and milling, etc.). Additive manufacturing methods can have extensive advantages over conventional methods. First, it allows for manufacture parts with highly intricate shapes and internal lattice structures. Second, it generates little waste and has high starting material utilization, especially in comparison with subtractive manufacturing such as milling. Third, it enables fast production with little lead time and low tooling cost. This can be especially true compared to molding methods which need to make molds before the desired parts are fabricated using the molds. Fourth, it enables on-demand fabrication of parts in small quantities without having to prepare expensive molds beforehand. It can also allow easy modification based on the fabricated part evaluation and is highly useful for prototyping. Overall, additive manufacturing methods can have extensive advantages over conventional manufacturing practices in many aspects.

Additive manufacturing methods can be categorized based on the materials or by technology used. Material selection for printing, includes, but is not limited to, thermoplastic and thermoset polymers, photopolymers (photomonomers/oligomers to be exact), metals, ceramics, (hydro) gels, paste, sand, composites, etc. Common 3D printing methods include fused deposition modeling (FDM, also known as FFF, fused filament fabrication), digital light processing (DLP), stereolithography (SLA), selective laser sintering (SLS), directed energy deposition (DED), direct ink writing (DIW), and binder jetting (BJ). FDM/FFF, SLS, and SLA/DLP are by far the most popular and the three main printing techniques that are in constant research and development worldwide.

Materials for the additive manufacturing can utilize a multitude of polymerization techniques to create 3D articles with desirable material performance properties for end-use applications. These polymerization reactions are typically initiated with UV radiation that is directed at portions of a solution of polymer precursor. Here, radiation can be directed (i.e., as an image) on the surface of a volume of solution in proximity to a pliable substrate such that a layer of polymer is deposited on the substrate. The substrate can then be moved further into the solution, a thin layer of polymer precursor can flow to cover the first polymer layer, and a second polymerization can be initiated to print a second layer of polymer onto the first layer. This process can be repeated to print a 3D object.

DLP and SLA are 3D printing techniques suitable for performing the systems and methods described herein. SLA and DLP 3D printers can vary regarding how light is projected onto the UV curable polymer resins. Earlier printers generally use SLA based on a laser system that moves around to cure the targeted area pixel by pixel. DLP, however, can cure a whole layer at one time. DLP 3D printers can use a digital projector screen to flash an image of a layer across the entire platform, curing all points in the same layer simultaneously. The light can be reflected on a Digital Micromirror Device (DMD), which is a dynamic mask comprising microscopic-size mirrors laid out in a matrix on a semiconductor chip. Rapidly toggling these tiny mirrors between the lens(es) that direct the light towards the resin can define the coordinates where the liquid resin cures within the given layer. Because the projector is a digital screen, the image of each layer is composed of square pixels, resulting in a three-dimensional layer formed from small rectangular cubes called voxels. This can enable DLP to become one of the fastest 3D printing techniques. Its other advantages include, but are not limited to, relatively low cost, versatile printing polymer selection, high printing resolution, and ease of operation.

DLP can have a selection of polymers and composites to print from including acrylates and methacrylate-functional polymers. UV curable formulations used in the DLP additive manufacturing industry can include ethylenically and/or vinyl-functional (i.e., double bond) oligomers and monomers (e.g., acrylates, methacrylates, vinyl ethers, vinyl carbonates), diluents, chain extenders, photo-initiators, and additives. The oligomers and monomers can provide mechanical properties to the final product upon polymerization. Diluents are used to reduce overall formulation viscosity for ease of processing and handling. Diluents can be reactive and can be incorporated into the polymer matrix of the finished article. Photo-initiators can form free radicals upon exposure to actinic radiation (e.g., through photolytic degradation of the photo-initiator molecule). The free radicals can then initiate and propagate with the vinyl moieties of the oligomers and monomers to form vinyl-based, cross-linked polymers. Additives can include but are not limited to pigments, dyes, UV absorbers, hindered amine light stabilizers, and fillers. Additives can be used to impart useful properties such as color, shelf stability, improved lifetime performance, higher UV stability, etc.

Printing on Pliable Substrates

In an aspect, provided herein is a method for printing a 3D object. With reference to FIG. 1, the method can include directing radiation 100 at a first location of a volume of polymer precursor 102. The location can be adjacent to a pliable substrate 104 that is moved through the vat of polymeric precursor. The radiation can polymerize the polymer precursor where (and sometimes adjacent to) where radiation is contacted, forming a first polymer layer 106 on or adjacent to the substrate. Note that FIG. 1 is a schematic diagram not to scale (e.g., the locations where radiation is directed can be finely controlled and directed to relatively small areas of the vat of polymeric precursor, i.e., to make objects having fine features).

Continuing with FIG. 1, the method can include moving 108 the pliable substrate through the volume of polymer precursor while maintaining contact with the peripheral edges 110 of the substrate. Radiation can be directed at a second location of the volume of polymer precursor which is adjacent to the first location, thereby forming a second polymer layer on the first polymer layer. The 3D object can be additively manufactured in this manner (i.e., polymerizing successive layers of polymer onto each other in a shape determined by areas of radiation exposure).

Figure 2:
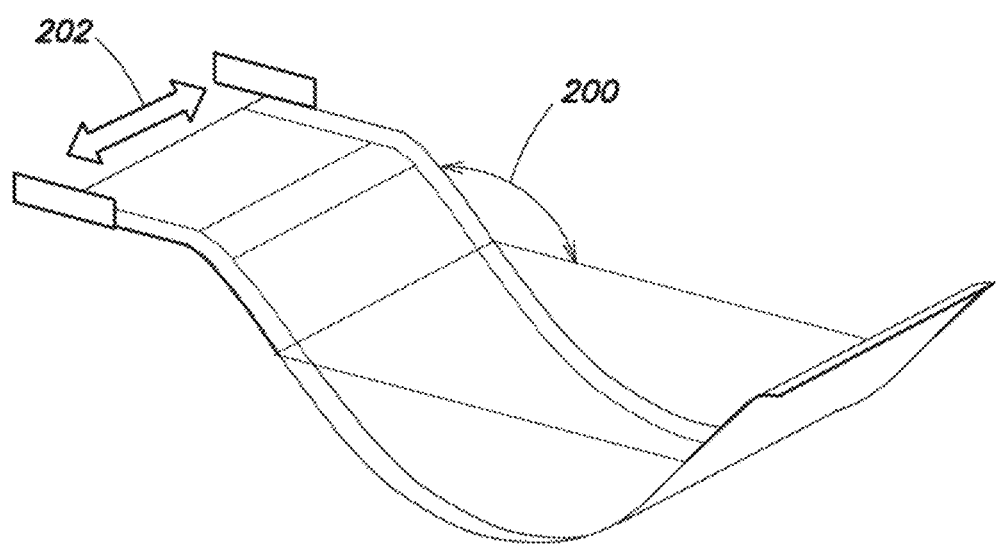
FIG. 2 shows an example of some points of control for printing a 3D object on a pliable substrate.

In an aspect, provided herein are systems and methods for precisely controlling the movement of the pliable substrate (e.g., in order to print 3D articles precisely). As shown in FIG. 2, the angle 200 at which the substrate enters the solution can be controlled. The substrate can then bend to turn direction and exit the solution. The motion of the substrate can be controlled precisely in order to print a polymer layer of a precise thickness. Furthermore, the substrate position and tension can be controlled 202, e.g., prior to, during, and throughout exit of the pliable substrate from the vat of polymeric precursor. The mechanism described herein can maintain contact with (e.g., pinch) the peripheral edges of the pliable substrate, e.g., in order to control the return radius 204 and maintain full control and positioning of the substrate.

Figure 3:
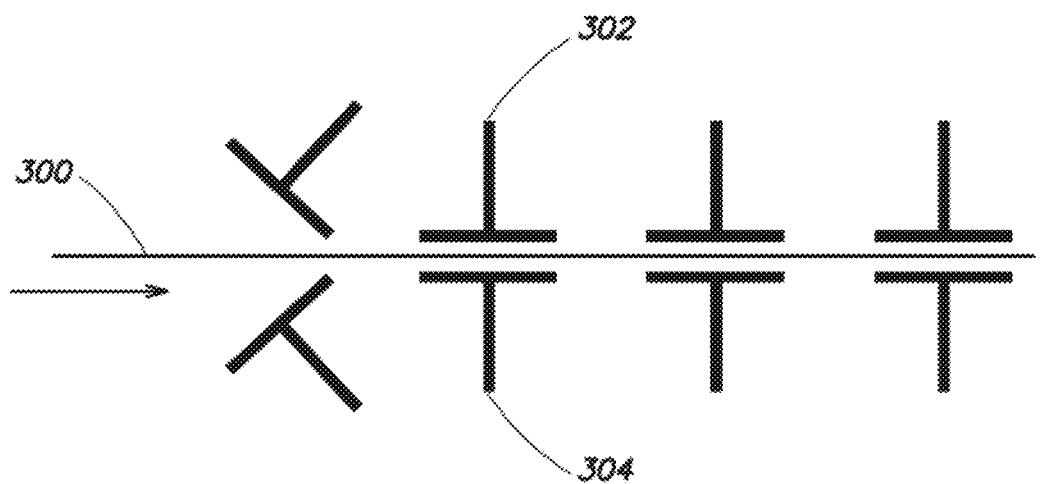
FIG. 3 shows an example of a pinching the peripheral edges of a pliable substrate.

FIG. 3 is a side view that shows the pliable substrate being pinched at its peripheral edges. The peripheral edges can be substantially parallel to a direction in which the substrate is moved through the vat. Here, the pliable substrate 300 becomes pinched between a first and second opposing pinch points 302, 304, which can move with and maintain contact with the pliable substrate.

The pliable substrate can move into the volume of polymer precursor, bend, and exit the volume of polymer precursor. The change of direction of the substrate can be particularly difficult to achieve because the printed article is on the surface so a roller cannot span the substrate on the side of the substrate having the printed article. As described herein, this challenge can be addressed by pinching the substrate along its edges in a mechanism that holds and then releases the substrate as shown here. In some instances, the surface of the substrate on which the first polymer layer is formed is not contacted by a roller spanning a width of the substrate. The 3D printed part is in attached to the top surface of the substrate, so using a roller to guide the substrate could flatten or harm the 3D printed object. Thus, the pliable substrate can be pinched at its edges without harm to the 3D printed object. The mechanism that maintains contact with the peripheral edges does not contact a portion of the pliable substrate upon which the first polymer layer is formed in some instances.

Such a system can be used with any length of pliable medium, including an endless loop of the pliable substrate. The system can restrict the degrees of freedom of the medium. The pinching and releasing mechanism can bend the pliable substrate at any angle, e.g., from 0 degrees to 180 degrees.

It can be advantageous to print and perform initial curing of the resin in an area where the substrate is moving in a straight line (e.g., such that the 3D object is not deformed). In some cases, the substrate is moving at a 45-degree angle with respect to the surface of the resin during printing. Amongst other advantages, a constant angle can help for representing the printed object as a series of planar slices (e.g., during digital rendering for control of the 3D printer). In some cases, a first linear pinch zone occurs before a bend in the pliable substrate. A second linear pinch zone can occur after the bend in the pliable substrate (as the 3D object exits the resin). A series of rollers can guide the pliable substrate through the bend between the linear pinch zones. The back side of the pliable substrate can be supported (e.g., which is on an opposite side of a surface of the pliable substrate upon which the polymer layers are printed). Contact can be maintained with the peripheral edges along substantially the entire portion of the pliable substrate that is in contact with the volume of polymer precursor. In some cases, contact is maintained with the peripheral edges of the substrate until the second polymer layer is cured.

Figure 4:
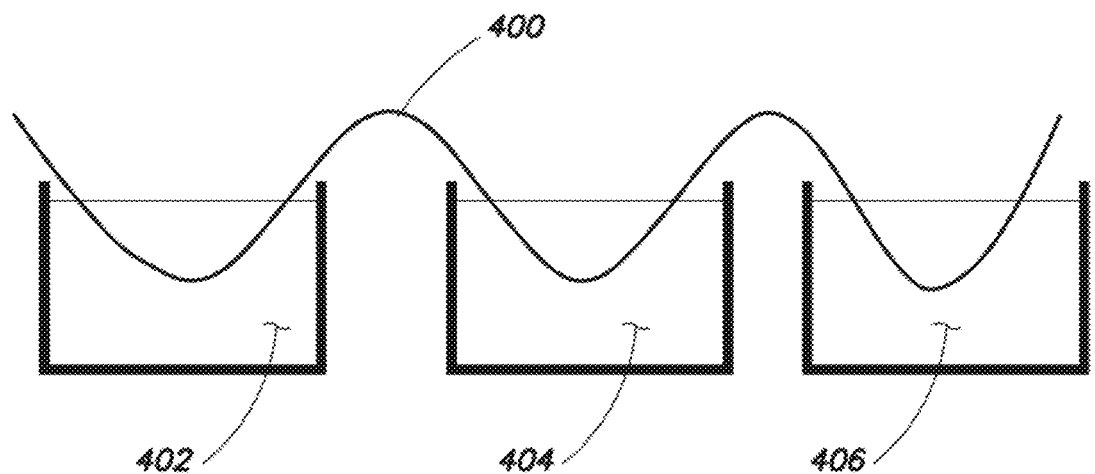
FIG. 4 shows an example of the systems and methods described herein being used to move a pliable substrate through a series of processing modules.

Multiple bends can be chained together to form more complicated flow paths, as shown in FIG. 4. The pliable substrate 400 can be moved through a series of modules which can perform various functions. Without limitation, the functions can include an initial 3D printing to form an article 402, washing the article 404, secondary curing of the article 406, or surface coating of the article.

The systems and methods described herein can have any number of advantages. For instance, sensing or monitoring the position of the substrate can become less critical or even unnecessary because the position of the pinching and driving mechanism can be known and strongly coupled to the substrate. The direction of movement of the substrate can be reversed. The entrance angle of the substrate into and through the printing zone can be controlled and potentially adjusted. The tension in the substrate can be controlled as well as the return radius, which can work to reduce the distortion of the printed article while it is being printed.

Figure 5:
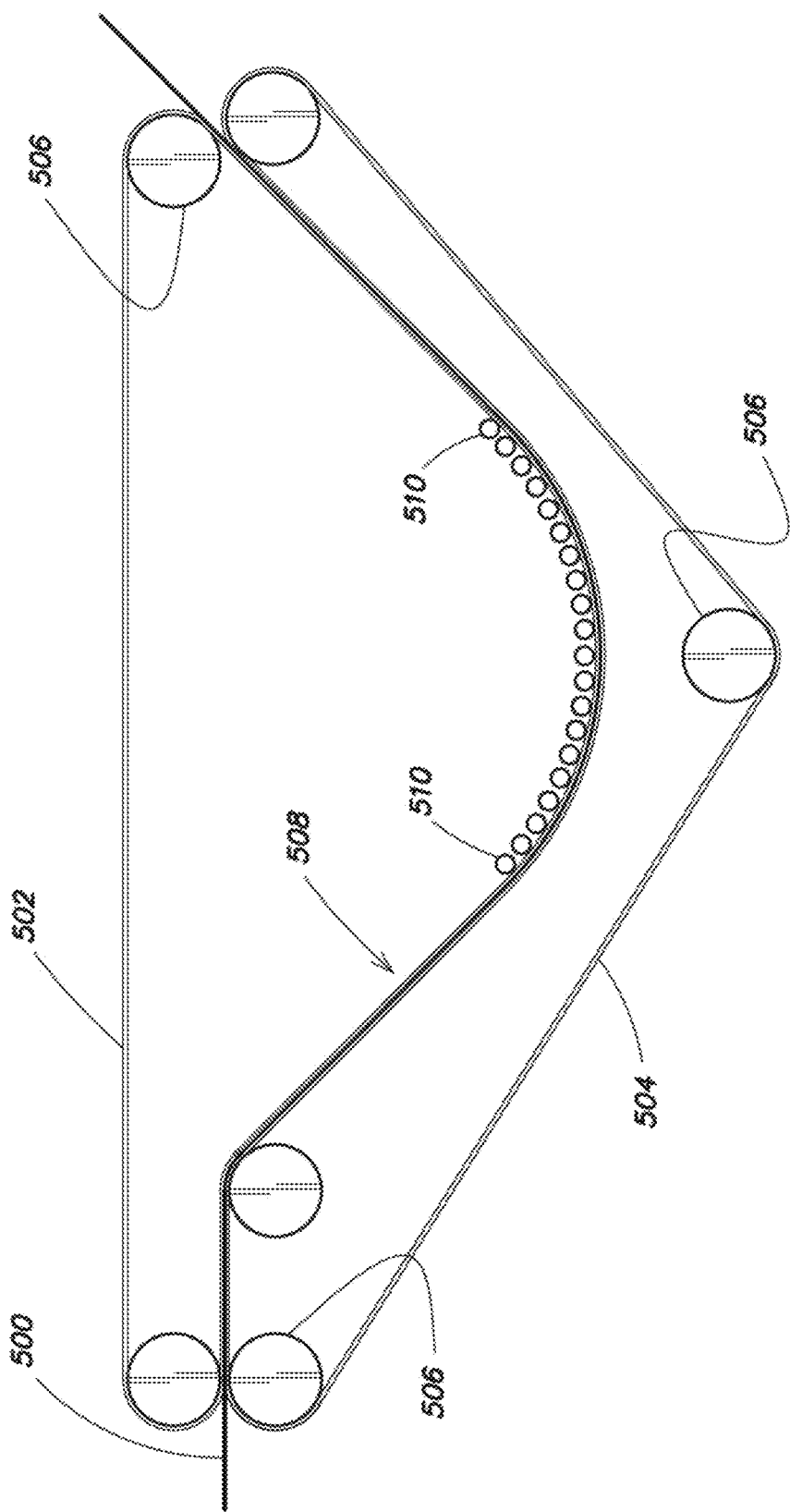
FIG. 5 shows an example of a side view of an embodiment of the systems and methods described herein.

The figures show various example implementations of the systems and methods described herein in more detail. For example, FIG. 5 shows a side view of an embodiment, which is not to scale. The substrate 500 can be fed between a clamping belt 502 and a timing control belt 504. A series of rollers 506 control the movement of the belts (i.e., but do not contact the printed side of the pliable substrate). The printing layer 508 is shown where the substrate enters the solution of monomer precursor. A series of back bend rollers 510 can change the direction of the substrate to exit the polymer precursor. Note that the back-bend rollers do not span the width of the substrate because the printed articles are on that top surface of the pliable substrate.

Figure 6:
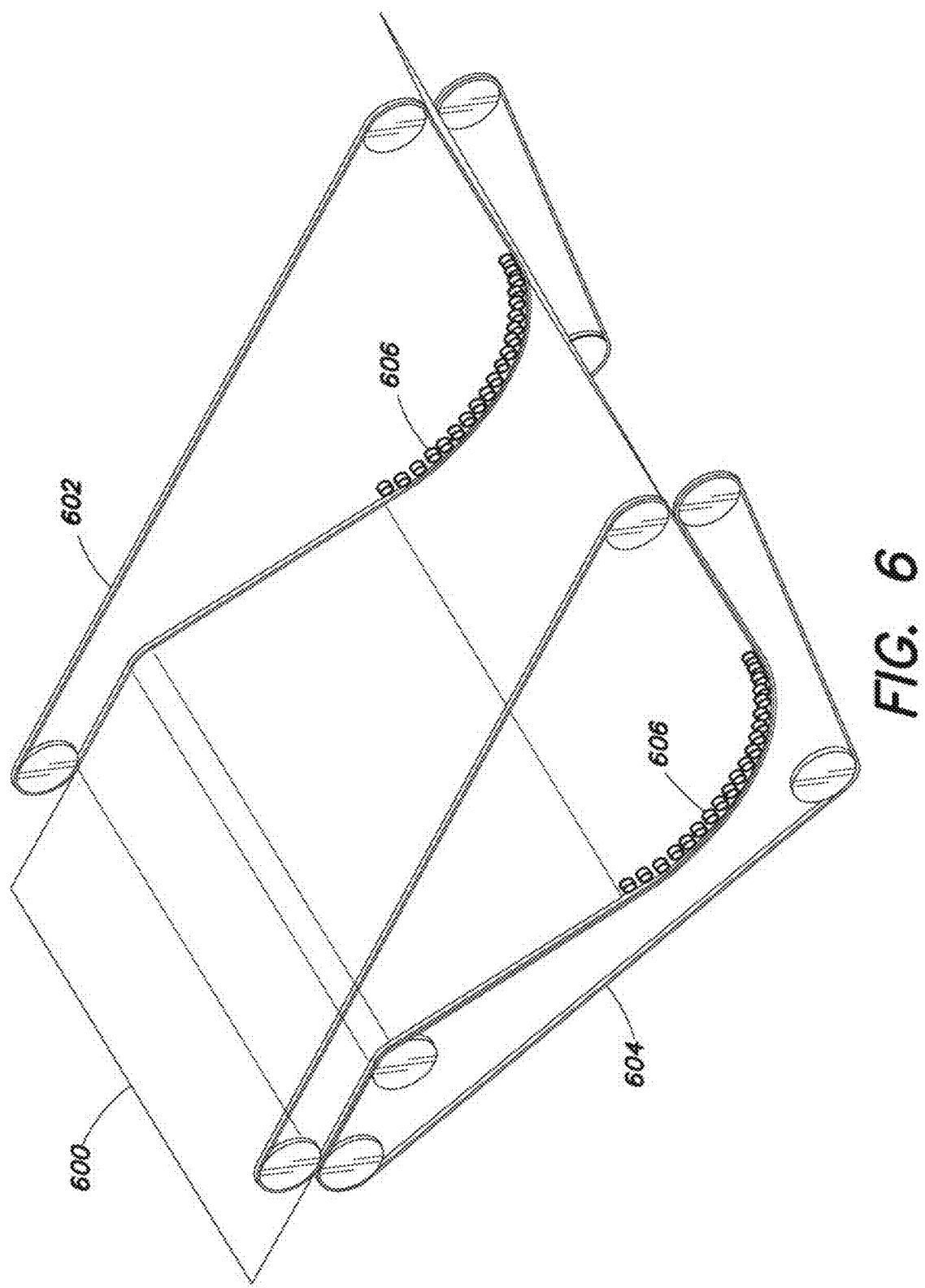
FIG. 6 shows an example of a top view of an embodiment of the systems and methods described herein.

FIG. 6 shows a top view of an embodiment of the systems and methods described herein. Here, the pliable substrate 600 can be pinched along its peripheral edges between the clamping belt 602 and the timing control belt 604. The back bend rollers 606 can be used to change the direction of the pliable substrate without spanning the printed surface.

Figure 7:
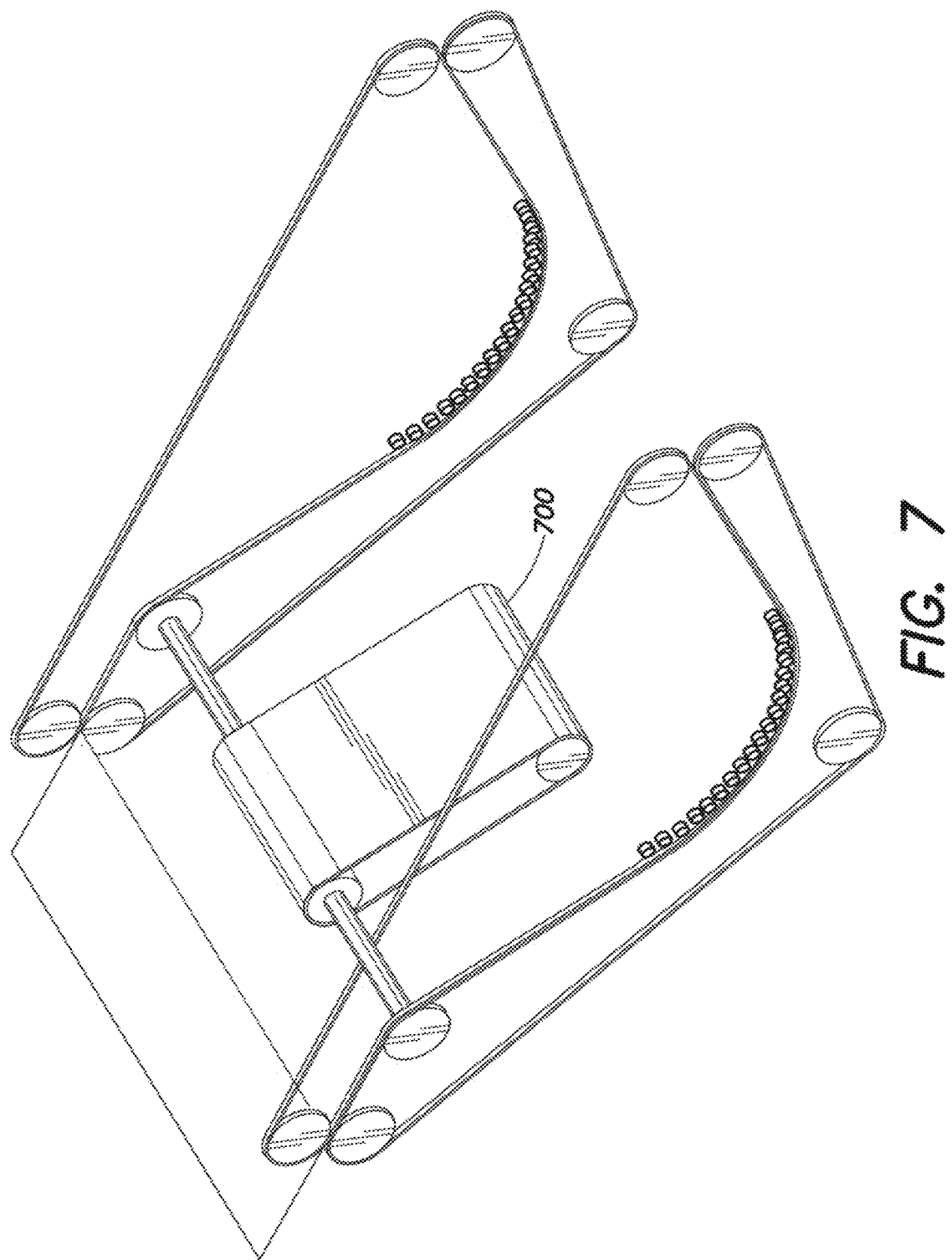
FIG. 7 shows an example of a top view of an embodiment of the systems and methods described herein having a support belt.

As shown in FIG. 7, the back of the pliable substrate can be supported with a support belt 700. The support belt can change angle in coordination with the clamping belt, the timing control belt, and/or the back-bend roller mechanism.

Figure 8:
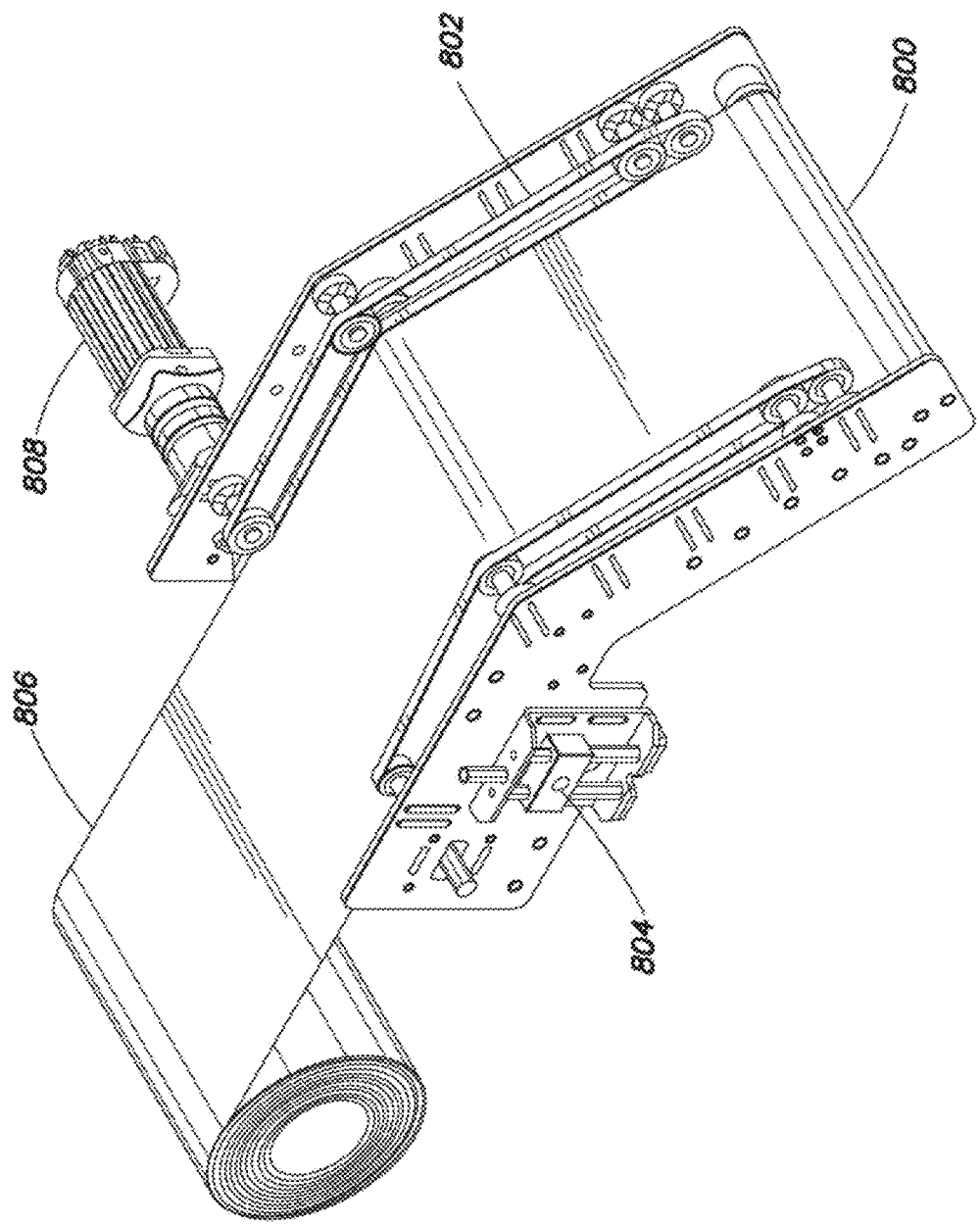
FIG. 8 shows an example of a scaled drawing of an embodiment of the systems and methods described herein.

FIG. 8 shows a scaled drawing of an embodiment of the systems described herein. The conveyor system can contain a wide conveyor belt 800, thin clamping belts or rollers 802, tensioning system 804, and supporting guide plate. The conveyor system can provide a high level of accuracy and precision with handling the pliable substrate. Some features of the design that can provide the accuracy and precision includes the wide conveyor belt which supports the pliable substrate 806. By controlling the conveyor plate running geometry, the pliable substrate can follow. In some cases, the alignment of the belt does not shift side-to-side during the printing process. The wide conveyor belt can have a guiding geometry built into the belt and rollers which keeps the belt aligned. The conveyor belt can run around two idlers which create a flat plane across the printing area when the proper tension is applied 804. A running plate can further help create the flat plane. The conveyor belt position can be controlled by a motor 808, e.g., with feedback controls. The conveyor belt can have proper tension to prevent slippage to the driving roller. The belt can have teeth and/or sensors to further increase reliability on accuracy and precision of the system. The conveyor system can capture the pliable substrate 806 on the edges with thin clamping belts or rollers 802. The thin clamping belts or rollers can move with the conveyor belt. This action can clamp the belt to prevent any slippage. The pliable substrate can be controlled on the conveyor from the beginning and across the printing area. The clamping belts or rollers can be positioned to maximize the clamping forces but not distort the printing area.

Figure 9:
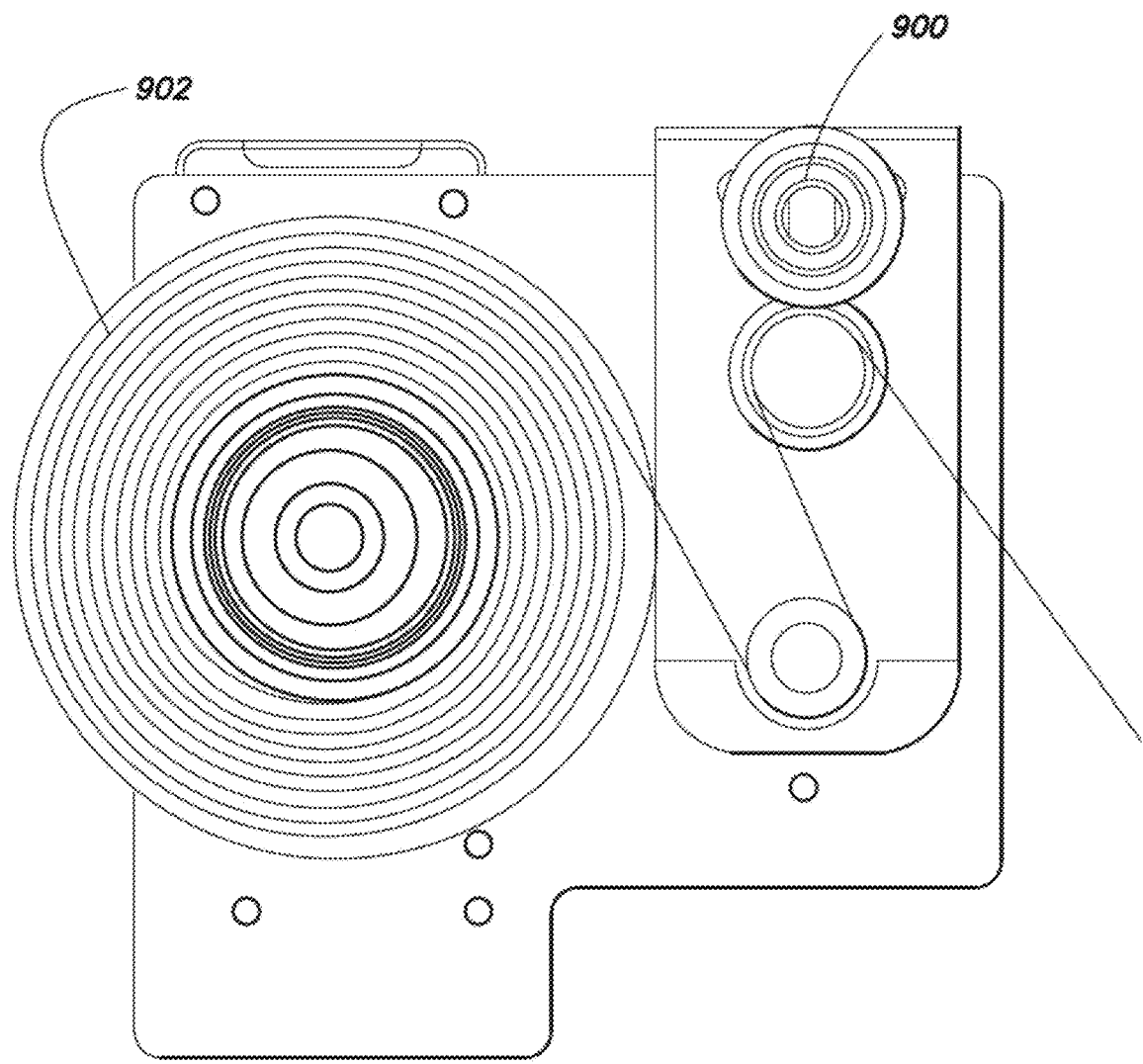
FIG. 9 shows an example of a system for maintaining relatively constant tension on a pliable substrate as it is dispensed from a roll.

In some cases, the pliable substrate is fed into the system from a roll. As shown in FIG. 9, the system can include a mechanism 900 for maintaining the substrate at a constant tension, e.g., as the radius of the roll 902 of substrate decreases. Such a system can allow elastic substrates to be used for 3D printing.

Figure 10:
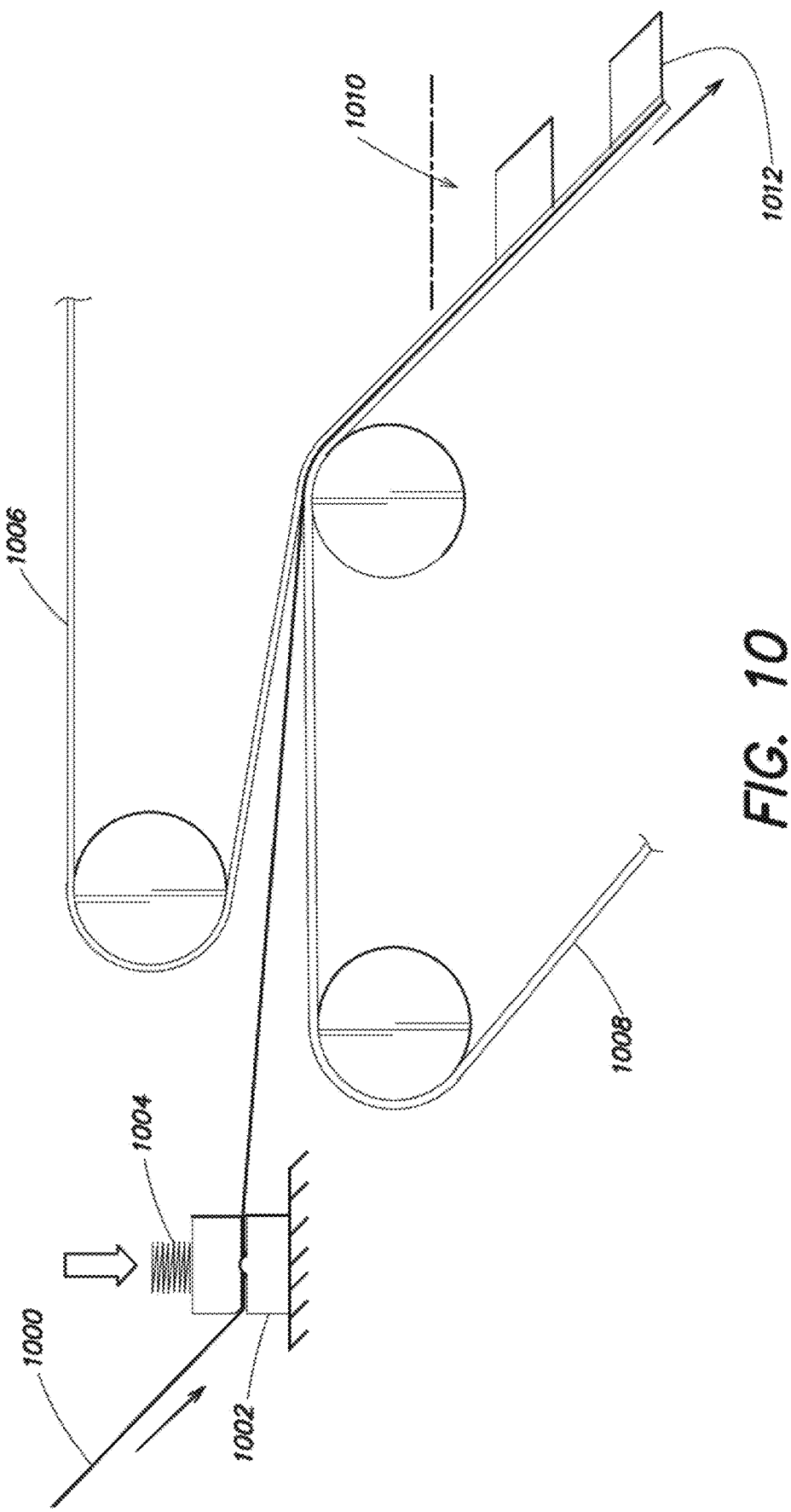
FIG. 10 shows an example of a mechanism for smoothing, guiding, and/or tensioning a pliable substrate in preparation for 3D printing thereon.
Figure 11:
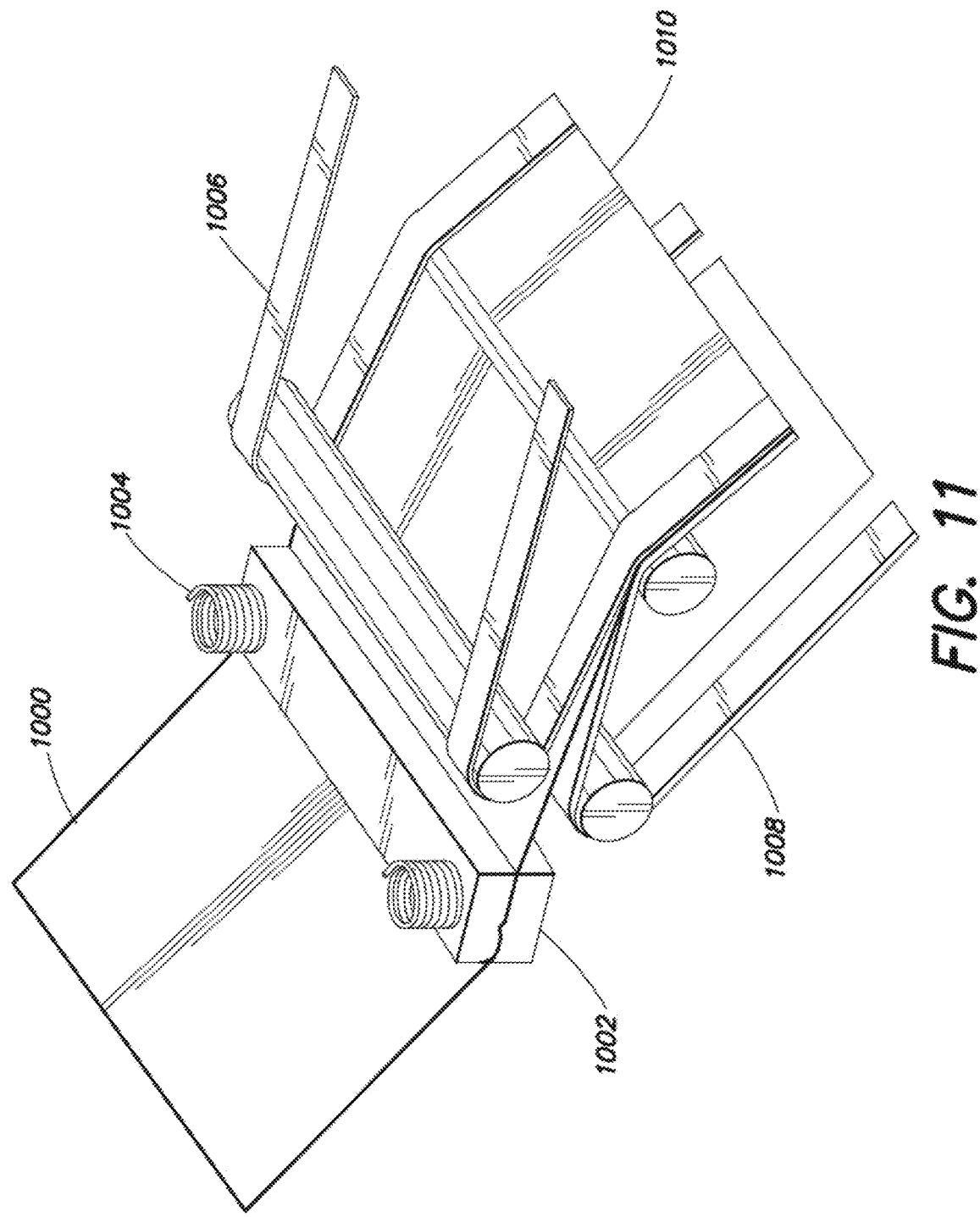
FIG. 11 shows an example of a scaled drawing of a mechanism for smoothing, guiding, and/or tensioning a pliable substrate.

Additional mechanisms can also be used to tension, guide, and/or smooth the substrate for clamping along its peripheral edges and 3D printing. As shown in FIG. 10, the pliable substrate 1000 can be directed through a substrate guide 1002 which can have adjustable tension applied by a clamping spring 1004. The substrate can then be clamped between a clamping belt 1006 and a support belt 1008 and travel through a print area 1010 for printing of 3D articles 1012. A three-dimensional drawing is shown in FIG. 11, where like numbers indicate like elements in comparison to FIG. 10. This feature can help prevent wrinkles and/or lateral movement of the pliable substrate.

Figure 12:
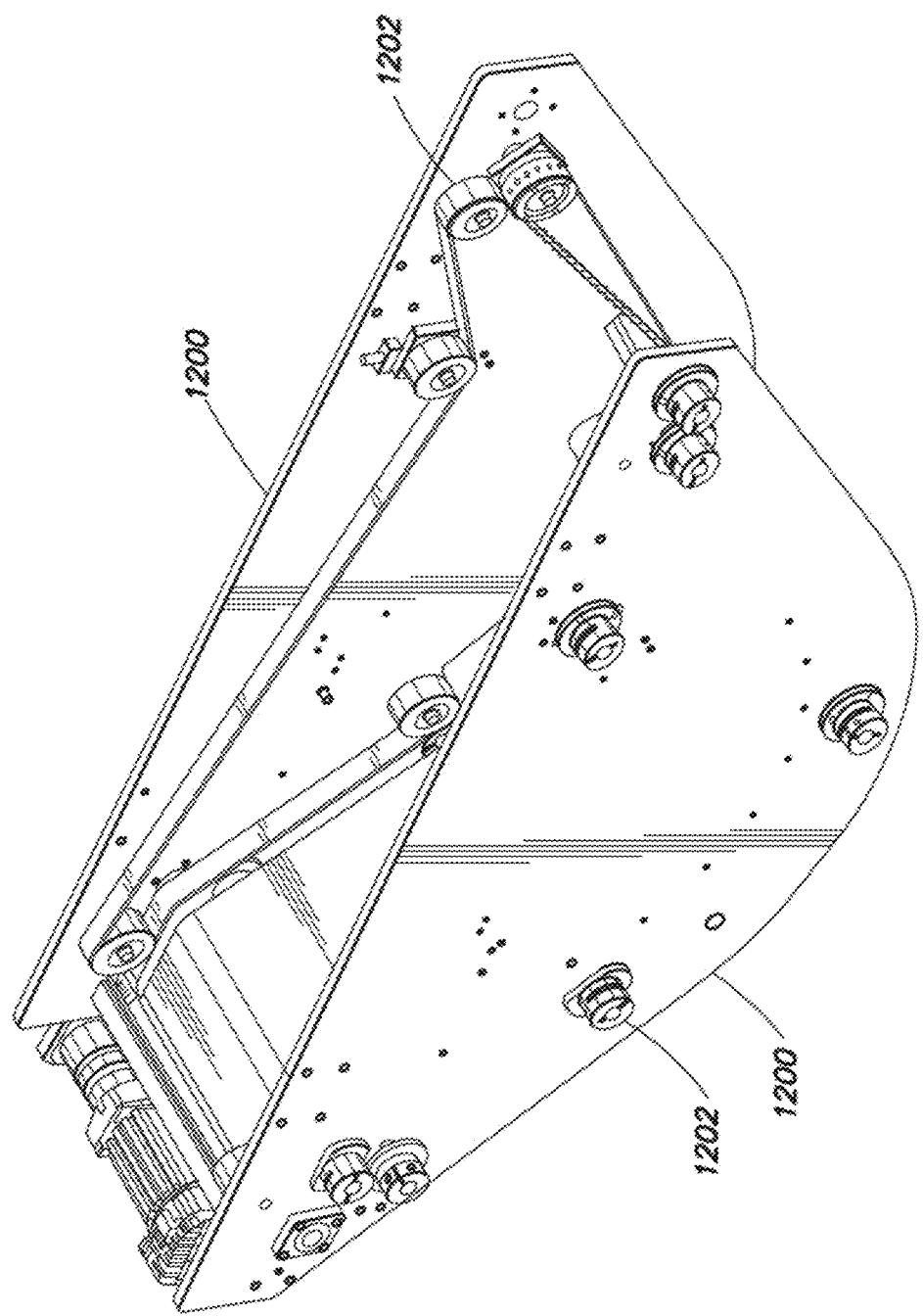
FIG. 12 shows an example of enclosure of the systems described herein in a vat configured to hold a volume of polymer precursor.

The systems described herein can be used within and adjacent to a vat configured to hold a volume of polymeric precursor. FIG. 12 shows sides of the vat 1200 upon which rollers 1202 for the clamping belt and the support belt can be mounted. A bottom (not shown) can retain the volume of polymeric precursor.

The pliable substrate can be any suitable material, such as nylon, polypropylene, or polyethylene. The pliable substrate can be a continuous sheet or mesh, typically thin. The pliable substrate can be rigid or elastic. The radiation that is directed on the polymeric precursor in proximity to the pliable substrate is typically UV light (e.g., emitted using a digital light processor (DLP)).

The 3D article can be printed as a series of layers. That is, a subsequent layer of polymeric precursor can be polymerized upon an earlier layer. The shape of the 3D object can be created by varying the size, shape, and position of the layers. The substrate can be advanced in a discontinuous manner between printing of layers (e.g., where it is substantially stationary during printing of a layer). However, in some embodiments, the substrate is advancing at substantially the same time that radiation is being directed on the resin and/or at the same time as resin is being cured. For example, the 3D object might not be printed as a series of layers.

The 3D article and/or the pliable substrate can undergo any suitable processing step prior to or subsequent to printing. For example, the substrate and/or 3D article can be washed (e.g., to remove uncured resin). The 3D article can be further cured after printing (e.g., by exposure to heat). The method can further comprise removing the 3D polymer object from the substrate. In some cases, the substrate is cut.

The systems and methods described herein can be used to control the movement of the pliable substrate with a high degree of precision. Such precision can be advantageous for printing layers of the 3D object that have a controlled thickness, which can improve the resolution of the printed object overall. For example, the substrate can be moved through the polymer precursor with a mechanical precision of less than (i.e., more precise than) about 100, less than about 50, less than about 30, less than about 20, or less than about 10 micrometers (urn). The second polymer layer can be formed on the first polymer layer with a pixel-by-pixel precision of less than (i.e., more precise than) about 100, than about 50, less than about 30, less than about 20, or less than about 10 micrometers (urn). The first and second layers of polymer can have a thickness precision of less than (i.e., more precise than) about 100, less than about 50, less than about 30, less than about 20, or less than about 10 micrometers (urn).

Printing Systems

In another aspect, provided herein is a system for printing a 3D object. The system can include a vat configured to maintain a solution of polymer precursor at a substantially constant level, a mechanism configured to move a pliable substrate through the vat while maintaining contact with the peripheral edges of the substrate, and a digital light processor (DLP) configured to direct radiation at a chosen portion of the solution of polymer precursor.

The mechanism and the digital light processor can be configured to print a 3D object. For example, the DLP creates a first polymer layer on or adjacent to the pliable substrate, the mechanism moves the pliable substrate through the vat, and the DLP creates a second polymer layer on the first polymer layer. The creation of the polymer layers and moving of the pliable substrate can be performed at substantially the same time. In some cases, the first layer and second layer of polymer are not distinct layers.

The peripheral edges can be substantially parallel to a direction in which the substrate is moved. The mechanism can be configured to pinch the pliable substrate at its peripheral edges. In some instances, the mechanism does not include a roller spanning a width of the substrate on a surface of the substrate on which the first polymer layer is formed. The mechanism can be configured to move the pliable substrate into the volume of polymer precursor, bend the pliable substrate, and remove the volume of polymer precursor.

The mechanism can include a series of rollers to guide the pliable substrate through the bend. The mechanism can further comprise a roller on an opposite side of a surface of the pliable substrate upon which the first polymer layer is printed that supports a back side of the pliable substrate. The mechanism can maintain contact with the peripheral edges along substantially the entire portion of the pliable substrate that is in contact with the volume of polymer precursor. The mechanism can maintain contact with the peripheral edges of the substrate until the second polymer layer is cured.

In some cases, the mechanism places the pliable substrate under a substantially constant tension while the substrate is in the volume of polymer precursor. The system can further include a guide configured to position the pliable substrate for contact with the peripheral edges of the substrate. The system can further include a clamping spring for smoothing the pliable substrate. The mechanism does not contact a portion of the pliable substrate upon which the first polymer layer is formed in some instances. The mechanism can be capable of changing a direction in which the substrate is moved through the polymer precursor.

The systems and methods described herein can be performed in various printing architectures. In some cases, the DLP directs light onto the open surface of a volume of polymer precursor (e.g., as shown in FIG. 1). This approach can have several advantages, but in some instances, this approach is limited by the time that it can take for a viscous polymer precursor solution to flow over the prior printed layer (i.e., before it can be printed into a second layer). In some instances, solution reflow is faster when the DLP directs light through a transparent window to contact the polymer precursor solution.

Figure 13:
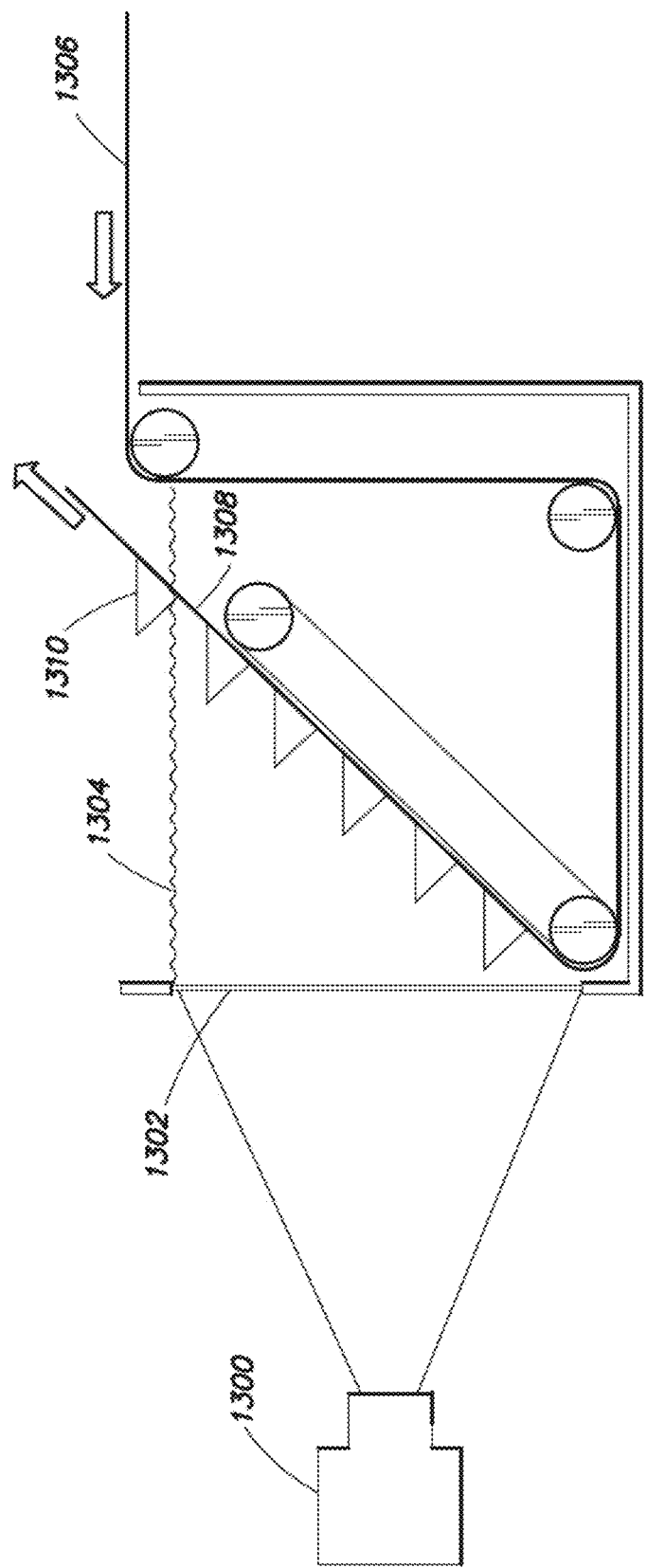
FIG. 13 shows an example of a system of the present disclosure for printing through a transparent window.
Figure 14:
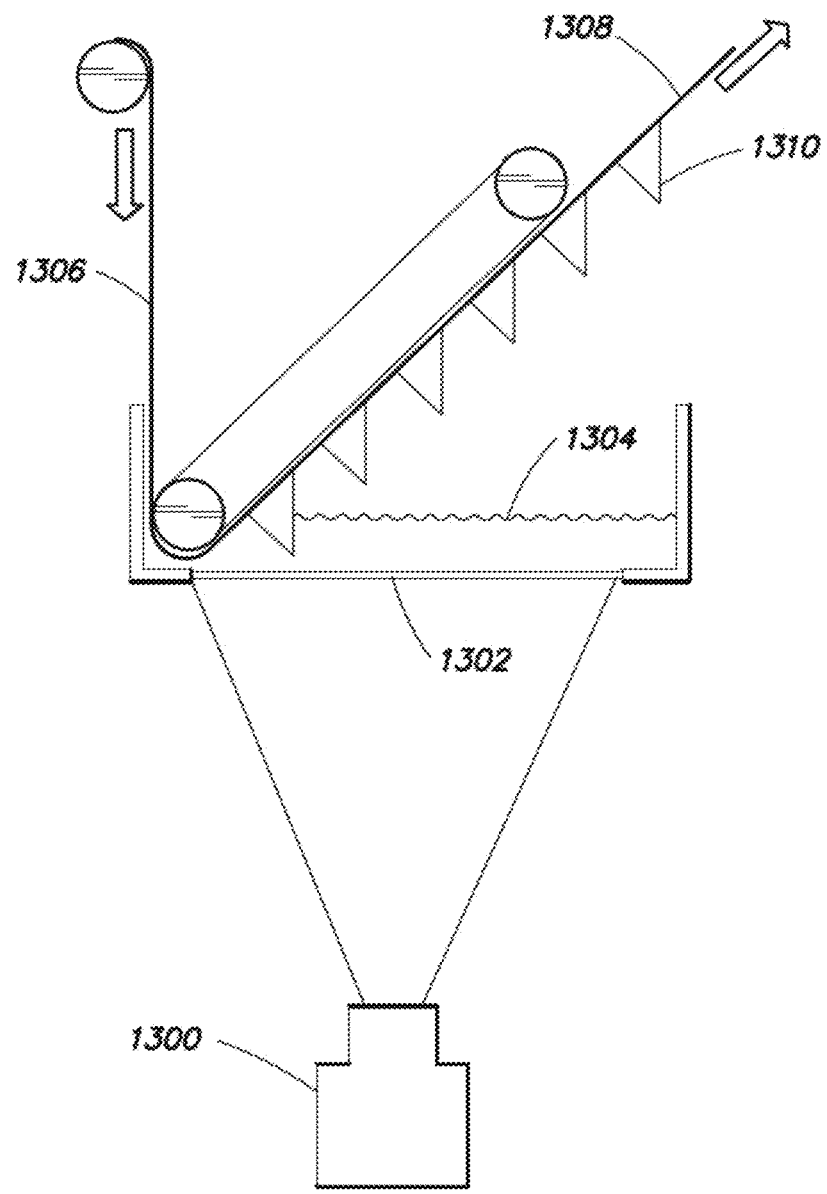
FIG. 14 shows an example of a system of the present disclosure for printing through a transparent window.

FIG. 13 and FIG. 14 show embodiments of the present disclosure for printing through a transparent window. Where like numbers denote like elements, a digital light processor 1300 can direct radiation through a transparent window 1302 onto polymeric precursor 1304 in the vicinity of a pliable substrate 1306. The pliable substrate can be pinched at its peripheral edges and supported on its back side 1308 with a belt while being moved through the polymeric precursor. Printed articles 1310 can form initially at the points at which radiation strikes the polymeric precursor, and exit the vat on the pliable substrate.

One potential disadvantage of 3D printing through a transparent window can be the suction forces between the printed article and the transparent window. These forces can harm or break the printed article. In some cases, the printed article has a greater affinity for the pliable substrate than for the transparent window.

Various strategies can be employed to facilitate reflow of the polymer precursor between the printed article and the transparent window. For example, the transparent window can be vibrated or a jet of solution can be directed toward the transparent window. The transparent window can have grooves through which the solution can flow. Furthermore, the temperature of the transparent window can be higher or lower than the temperature of the solution (e.g., so that the solution is less viscous at the window and/or so that the degree of polymerization is lower at the window).

The transparent window can be on the bottom of a vat of the polymer precursor. Embodiments having a transparent window can utilize the mechanisms described herein for controlling the movement of the pliable substrate. The pliable substrate can be pinched at its edges and supported by a belt on the side of the substrate opposite the side on which the articles are printed.

In another aspect, provided herein is a method for printing a 3D object through a transparent window onto a pliable substrate. The method can include directing radiation through a transparent window of a vat containing a volume of polymer precursor, wherein the radiation is directed at a first location which is adjacent to a pliable substrate, thereby forming a first polymer layer on or adjacent to the substrate; moving the pliable substrate through the volume of polymer precursor; and directing radiation through the transparent window at a second location which is adjacent to the first location, thereby forming a second polymer layer on the first polymer layer.

In another aspect, provided herein is a system for printing a 3D object. The system can include a vat having a transparent window, which vat is configured to maintain a solution of polymer precursor at a substantially constant level, a mechanism configured to move a pliable substrate through the vat in proximity to the transparent window, and a digital light processor (DLP) configured to direct radiation through the transparent window at a chosen portion of the solution of polymer precursor.

The pliable substrate can be supported on its back side along substantially all of a printing path. The printing path can start adjacent to the first location and ends when the substrate exits the vat. The back side of the substrate can be distal to the transparent window.

The first polymer layer can have a higher affinity for the pliable substrate than for the transparent window. In some cases, the transparent window is vibrated. The transparent window can have grooves that allow non-polymerized polymer precursor to flow between the transparent window and the first polymer layer. The temperature of the transparent window can be greater or less than a temperature of the vat of polymer precursor. The polymer precursor can be directed with force toward the transparent window.

Also, it should be appreciated that one or more 3D printing systems may be used to implement the methods described herein. For example, some embodiments may be used in conjunction with one or more systems described in U.S. patent application Ser. No. 16/552,382, filed Aug. 27, 2019, incorporated herein in its entirety. However, it should be appreciated that other printer methods and systems may be used with embodiments as described herein.

The geometry of the article to be printed can be digitally represented in any suitable file structure (e.g., for use in controlling the 3D printer). Such systems can include slicing the geometry into a plurality of layers, e.g., as described in U.S. patent application Ser. No. 17/211,603, filed Mar. 24, 2021, incorporated herein in its entirety. Such systems, methods, and file formats can be suitable for printing microstructures.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware or with one or more processors programmed using microcode or software to perform the functions recited above.

In this respect, it should be appreciated that one implementation of the embodiments of the present invention comprises at least one non-transitory computer-readable storage medium (e.g., a computer memory, a portable memory, a compact disk, etc.) encoded with a computer program (i.e., a plurality of instructions), which, when executed on a processor, performs the above-discussed functions of the embodiments of the present invention. The computer-readable storage medium can be transportable such that the program stored thereon can be loaded onto any computer resource to implement the aspects of the present invention discussed herein. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the present invention.

Various aspects of the present invention may be used alone, in combination, or in a variety of arrangements not specifically discussed in the embodiments described in the foregoing and are therefore not limited in their application to the details and arrangement of components set forth in the foregoing description or illustrated in the drawings. For example, aspects described in one embodiment may be combined in any manner with aspects described in other embodiments.

Also, embodiments of the invention may be implemented as one or more methods, of which an example has been provided. The acts performed as part of the method(s) may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A method for printing a 3D object, the method comprising:
   a. directing radiation at a first location of a volume of polymer precursor adjacent to a pliable substrate, thereby forming a first polymer layer on or adjacent to the pliable substrate;
   b. moving the pliable substrate through the volume of polymer precursor while pinching peripheral edges of the pliable substrate by one or more pairs of pinch points on opposing surfaces of the pliable substrate such that at a corresponding contact point on the pliable substrate, the one or more pairs of pinch points are opposing to each other, wherein each pinch point of the one or more pairs of pinch points is configured to move linearly with the pliable substrate and maintain contact with the corresponding contact point on the pliable substrate while the pliable substrate is moving; and
   c. directing radiation at a second location of the volume of polymer precursor which is adjacent to the first location, thereby forming a second polymer layer on the first polymer layer.

2. The method of claim 1, wherein the peripheral edges are parallel to a direction in which the pliable substrate is moved.

3. The method of claim 1, wherein a surface of the pliable substrate on which the first polymer layer is formed is not contacted by a roller spanning a width of the pliable substrate.

4. The method of claim 1, wherein the pliable substrate moves into the volume of polymer precursor, bends, and exits the volume of polymer precursor, wherein the pliable substrate bends at a bend.

5. The method of claim 4, further comprising, while moving the pliable substrate through the volume of polymer precursor, pinching the peripheral edges of the pliable substrate by the one or more pairs of pinch points, wherein a first linear pinch zone comprising the one or more pairs of pinch points occurs before the bend in the pliable substrate and a second linear pinch zone comprising the one or more pairs of pinch points occurs after the bend in the pliable substrate.

6. The method of claim 4, wherein a series of rollers guide the pliable substrate through an area in which the pliable substrate bends.

7. The method of claim 1, further comprising supporting a back side of the pliable substrate which is on an opposite side of a surface of the pliable substrate upon which the first polymer layer is printed.

8. The method of claim 1, wherein contact is maintained with the peripheral edges along the entire portion of the pliable substrate that is in contact with the volume of polymer precursor.

9. The method of claim 1, wherein contact is maintained with the peripheral edges of the pliable substrate until the second polymer layer is cured.

10. The method of claim 1, wherein the pliable substrate is under a constant tension while the pliable substrate is in the volume of polymer precursor.

11. The method of claim 1, further comprising guiding or positioning the pliable substrate prior to maintaining contact with the peripheral edges of the pliable substrate.

12. The method of claim 1, further comprising smoothing the pliable substrate.

13. The method of claim 12, wherein the pliable substrate is smoothed prior to maintaining contact with the peripheral edges of the pliable substrate.

14. The method of claim 1, further comprising repeating (c) to produce a 3D polymer object.

15. The method of claim 14, further comprising removing the 3D polymer object from the pliable substrate.

16. The method of claim 1, wherein a mechanism that maintains contact with the peripheral edges does not contact a portion of the pliable substrate upon which the first polymer layer is formed.

17. The method of claim 1, wherein the one or more pairs of pinch points comprise a first flat surface in touch with a first surface of the opposing surfaces of the pliable substrate and a second flat surface in touch with a second surface of the opposing surfaces of the pliable substrate, the first surface and the second surface being opposite each other.

* * * * *